July 11, 1972     E. N. PENNINGTON     3,676,066

PROCESS CONTROL

Filed Sept. 17, 1970

INVENTOR.
E. N. PENNINGTON

BY Young & Quigg

ATTORNEYS

United States Patent Office 3,676,066
Patented July 11, 1972

3,676,066
PROCESS CONTROL
Edward N. Pennington, Bartlesville, Okla., assignor to Phillips Petroleum Company
Filed Sept. 17, 1970, Ser. No. 73,070
Int. Cl. C01c 1/04
U.S. Cl. 23—198                                      8 Claims

ABSTRACT OF THE DISCLOSURE

A chemical process in which unreacted feed constituents are recycled, such as ammonia synthesis, is controlled by establishing a first signal representative of the ratio of two constituents fed to a reactor. A second signal is established which is representative of the derivative of the first signal. In response to a combination of the first and second signals, the ratio of feed constituents to the process is controlled.

In various chemical processes it is common practice to recycle unreacted materials from the outlet to the inlet of a reactor. One example of such a system occurs in the production of ammonia. The ratio of hydrogen to nitrogen in the feed to an ammonia synthesis reactor is important if maximum ammonia production is to be obtained. Since the conversion per pass through the reactor is usually of the order of about 25 percent, substantially quantities of unreacted gasses are normally recycled. If the quantity of either reactant in the feed stream is too great, the quantity of this reactant in the recycle stream can build up quite rapidly and thereby reduce the production rate.

This invention is directed to a control procedure which permits the composition of feed to a reactor to be regulated in response to an analysis of the feed introduced into the reactor or an analysis of a recycle stream. A sample of the selected stream is analyzed, and a first signal is established which is representative of the ratio of two constituents thereof. This signal is then differentiated with respect to time to establish a second signal which is employed for control purposes. The second signal is utilized in combination with the first signal to regulate the ratio of the feed constituents introduced into the system so as to maintain a predetermined ratio at the point of analysis. The invention is particularly useful in the control of ammonia producing operations and other processe characterized by partial conversion of two or more feed components which react in fixed ratios to one another. In another aspect, this invention provides novel control apparatus which employs signal differentiating means.

Figure 1:
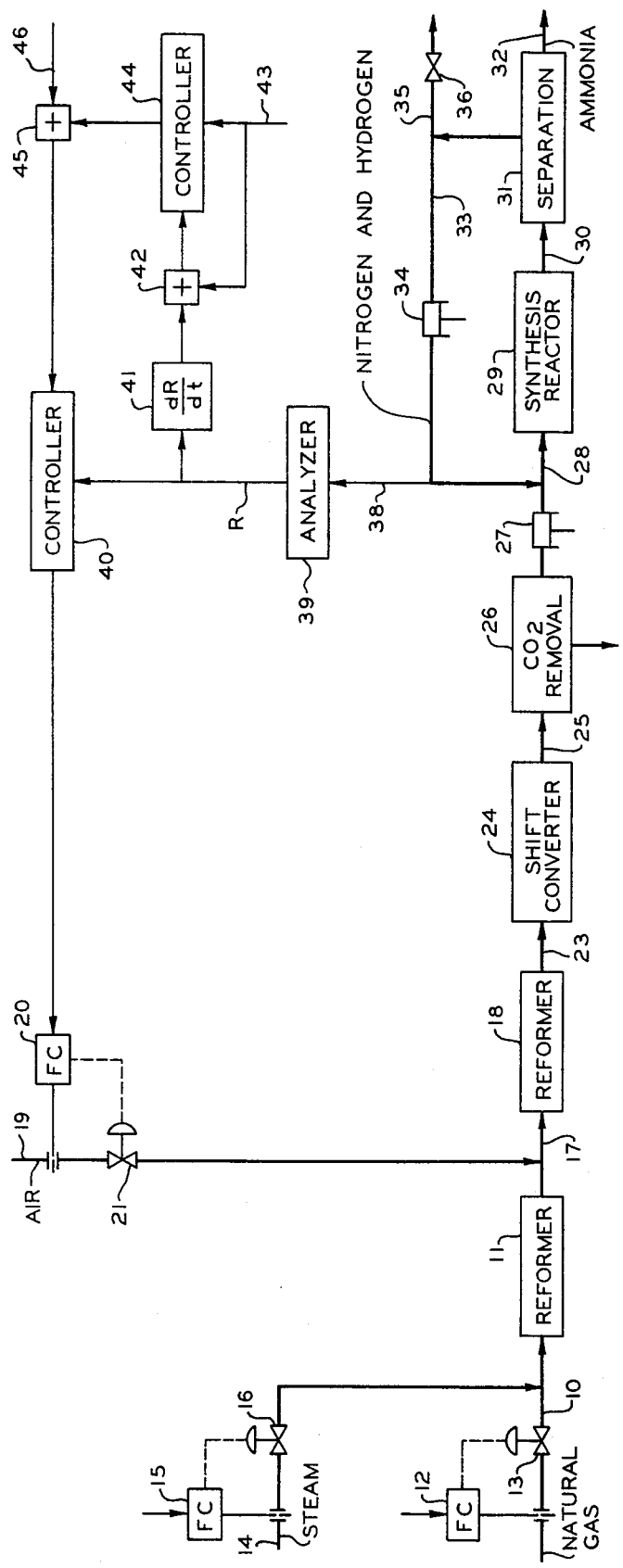
Figure 2:
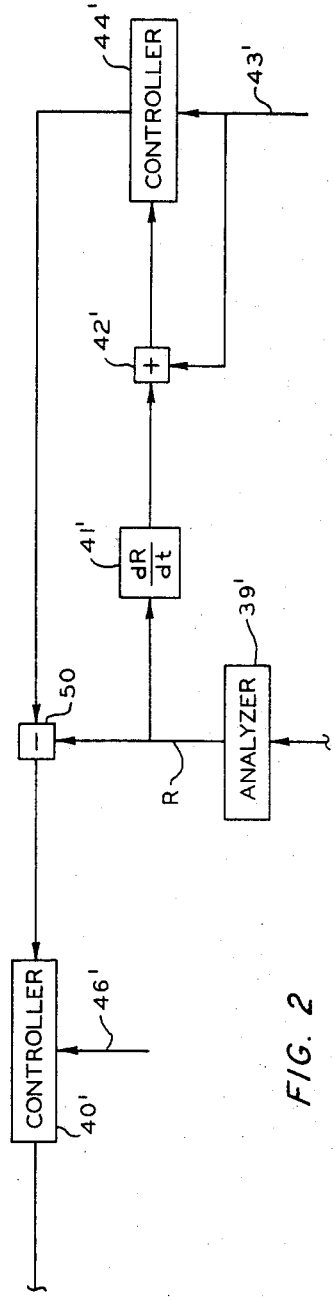

In the accompanying drawing, FIG. 1 is a schematic representation of an ammonia producing plant having the control apparatus of this invention incorporated therein. FIG. 2 is a schematic illustration of a second embodiment of the control apparatus of FIG. 1.

Referring now to the drawing in detail and to FIG. 1 in particular, a stream of natural gas or other light hydrocarbons is introduced through a conduit 10 which communicates with the inlet of a first reformer 11. The flow through conduit 10 is maintained at a predetermined rate by a flow controller 12 which regulates a valve 13. Steam is introduced through a conduit 14 which also communicates with the inlet of reformer 11. A predetermined flow through conduit 14 is maintained by a flow controller 15 which regulates a valve 16. The effluent from reformer 11 is directed through a conduit 17 to the inlet of a second reformer 18. Air is introduced through a conduit 19 which communicates with the inlet of reformer 18. The flow of air through conduit 19 is regulated by a flow controller 20 which adjusts a valve 21.

In a typical operation, approximately 65% of the hydrocarbons present in the feed stream introduced through conduit 10 are converted to hydrogen carbon monoxide and carobn dioxide in the primary reformer 11. As will be explained hereinafter in greater detail, the amount of air introduced through conduit 19 is regulated to give a desired ratio of hydrogen to nitrogen in the final synthesis gas. Additional hydrocarbons are converted in the secondary reformer 18.

The effluent from reformer 18 is passed through a conduit 23 to a shift converter 24 wherein carbon monoxide and steam are converted to additional hydrogen and carbon dioxide. The effluent from converter 24 is directed through a conduit 25 to carbon dioxide removal equipment 26. Carbon dioxide is typically removed by absorption with monoethanolamine. The effluent from equipment 26 is passed to a multistage compressor 27 which serves to raise the pressure of the synthesis gases to a pressure in the general range of 2500 to 5000 p.s.i.g. At this point, the purified gas mixture ideally comprises hydrogen and nitrogen in a mol ratio of approximately 2.8/1. While the ratio of hydrogen to nitrogen in ammonia is 3/1, nitrogen is more soluble in ammonia than is hydrogen. Thus, the charge to the reactor should be more nearly 2.8/1. Small amounts of methane, argon and other inert materials normally are also present, which can be removed by use of auxiliary equipment, if desired.

The compressed gases are directed through a conduit 28 to a synthesis reactor 29 in which the hydrogen and nitrogen are converted to ammonia. The effluent from reactor 29 is directed through a conduit 30 to separation facilities 31 wherein the produced ammonia is separated from unreacted gases. A product ammonia stream is removed through a conduit 32. The unreacted gases are directed through a conduit 33 to the inlet of a compressor 34. The resulting compressed gases are passed to the inlet of reactor 29 to be recycled. A portion of the unconverted gases can be bled from the system through a conduit 35 which has a valve 36 therein.

The system thus far described constitutes a typical ammonia producing operation of a type well known in the art. Such processe are described in U.S. Pats. 2,610,106; 2,881,053 and 3,413,091; for example. The present invention is directed to a control procedure which is particularly adapted for use in an ammonia producing system of the type described.

A sample of the recycle gas stream is passed through a conduit 38 to an analyzer 39. As an alternative, the sample can be taken from the combined streams introduced into reactor 29. Analyzer 39, which can be a chromatographic analyzer, establishes an output signal R which is representative of the ratio of hydrogen to nitrogen in the sampled stream. If a single chromatographic column is employed, peaks representative of hydrogen and nitrogen can be stored and divided. If separate columns are employed to measure hydrogen and nitrogen, the two output signals can be divided, one by the other. The signal R is passed to the measurement input of a conventional controller 40 and to a differentiator 41 which establishes an output signal representative of the derivative of signal R with respect to time. The output signal from differentiator 41 is applied to a summing device 42. A bias signal 43 is added to the derivative signal in summing device 42. The magnitude of signal 43 is selected so that the amplitude of the output signal from summing device 42 is in a predetermined range. The resulting signal is applied to the measurement input of a second conventional controller 44 which also receives signal 43. Any difference between the two input signals is acted upon via known control modes to produce an output signal which is applied to a summing device 45. A set point signal 46, which is representative of the desired ratio (2.8/1) hydrogen to nitrogen in the feed stream, is applied to the second input of summing device 45. The output signal from device 45 is applied as the set point signal to controller 40. An output signal responsive to a difference between the two input signals applied to controller 40 is produced and is applied as the set point to flow controller 40. An output signal responsive to a difference conduit 19, which supplies nitrogen is adjusted so as to maintain a predetermined ratio between the hydrogen and nitrogen concentrations of the gas stream introduced into reactor 29.

Bias signal 43 is employed to advantage to establish a "zero" point near the mid-scale of controller 44. This permits both positive and negative derivative signals to be employed by the control system. Summing device 45 serves to add or subtract the resulting derivative signal from the nominal set point signal 46. In this manner, changes in the measured ratio of hydrogen to nitrogen are incorporated into the control loop to provide smooth and precise control. Controllers 40 and 44 can be provided with both proportional and integral modes of control as is conventional.

A second embodiment of the control system is illustrated in FIG. 2 in which corresponding elements are designated by like primed reference numerals. In the system of FIG. 2, the output signal R from analyzer 39' is applied to the first input of a subtracting device 50. The output signal from controller 44' is applied to the second input of subtractor 50. The output signal from subtractor 50 is applied to the measurement input of controller 40', which also receives a set point signal 46' that is representative of the desired ratio of hydrogen to nitrogen in the feed stream to synthesis reactor 29. In the system of FIG. 2 the measured signal is modified by the derivative signal instead of the set point signal. The net result is the same.

While this invention has been described in conjunction with presently preferred embodiments, it obviously is not limited thereto.

What is claimed is:

1. In a process in which first and second reactants are introduced into reaction zone, and unreacted first and second reactants are recycled from the outlet to the inlet of said reaction zone; a control method which comprises analyzing reactants introduced into the reaction zone and establishing a first signal representative of the ratio of the first reactant to the second reactant, differentiating said first signal with respect to time to establish a second signal, establishing a set point third signal representative of a desired ratio of the first reactant to the second reactant in the reaction zone, adding said second signal to said third signal to produce a fourth signal, comparing said first signal with said fourth signal and establishing a fifth signal representative of any difference therebetween and controlling the relative rates of introduction of said first and second reactants into the reaction zone in response to said fifth signal.

2. The control method of claim 1 wherein the first and second reactants are hydrogen and nitrogen, respectively, and the process is the production of ammonia, and wherein the control of relative rates is accomplished by regulating the flow rate of nitrogen into the reaction zone.

3. Apparatus comprising:
an analyzer adapted to analyze a fluid mixture and establish a first signal representative of the ratio of first and second constituents thereof;
signal differentiating means connected to said analyzer to receive said first signal and establish a second signal representative of the derivative thereof with respect to time;
signal summing means having a first input connected to said differentiating means to receive said second signal and a second input adapted to receive a set point signal;
a controller having first and second inputs and an output, said controller establishing an output signal representative of the difference between signals applied to the two inputs thereof;
means applying said first signal to one of the inputs of said controller; and
means applying the output signal from said summing means to the second input of said controller.

4. The apparatus of claim 3, further comprising:
a second signal summing means having first and second inputs;
a second controller having first and second inputs and an output, said second controller establishing an output signal representative of the difference between signals applied to the two inputs thereof;
means applying a reference signal to first inputs of said second summing means and said second controller;
means applying said second signal to the second input of said second summing means;
means applying the output of said second summing means to the second input of said second controller; and
means applying the output of said second controller to said first input of the first-mentioned summing means.

5. Apparatus comprising:
an analyzer adapted to analyze a fluid mixture and establish a first signal representative of the ratio of first and second constituents thereof;
signal differentiating means connected to said analyzer to receive said first signal and establish a second signal representative of the derivative thereof with respect to time;
signal subtracting means having a first input connected to said differentiating means to receive said second signal and a second input connected to said analyzer to receive said first signal;
a controller having first and second inputs and an output, said controller establishing an output signal representative of the difference between signals applied to the two inputs thereof; and
means applying the output of said subtracting means to the first input of said controller, the second input of said controller being adapted to receive a set point signal.

6. The apparatus of claim 5, further comprising:
a signal summing means having first and second inputs;
a second controller having first and second inputs and an output, said second controller establishing an output signal representative of the difference between signals applied to the two inputs thereof;
means applying a reference signal to first inputs of said summing means and said second controller;
means applying said second signal to the second input of said summing means;
means applying the output of said summing means to the second input of said second controller; and
means applying the output of said second controller to said second input of said subtracting means.

7. In a process in which first and second reactants are introduced into reaction zone, and unreacted first and second reactants are recycled from the outlet to the inlet of said reaction zone; a control method which comprises analyzing reactants introduced into the reaction zone and establishing a first signal representative of the ratio of the first reactant to the second reactant, differentiating said first signal with respect to time to establish a second signal, establishing a set point third signal representative of a desired ratio of the first reactant to the second reactant in the reaction zone, subtracting said second signal from said first signal to produce a fourth signal, comparing said third signal with said fourth signal and establishing a fifth signal representative of any difference therebetween, and controlling the relative rates of introduction of said first and second reactants into the reaction zone in response to said fifth signal.

8. The control method of claim 7 wherein the first and second reactants are hydrogen and nitrogen, respectively, and the process is the production of ammonia, and wherein the control of relative rates is accomplished by regulating the flow rate of nitrogen into the reaction zone.

References Cited

UNITED STATES PATENTS

| | | | |
|---|---|---|---|
| 3,095,887 | 7/1963 | Lupfer | 137—3 |
| 3,130,187 | 4/1964 | Tolin et al. | 23—198 X |
| 2,894,821 | 7/1959 | Jordan et al. | 23—198 |
| 3,224,947 | 12/1965 | Lupfer | 23—253 X |
| 3,255,105 | 6/1966 | Murray | 208—Dig. 1 |
| 3,276,843 | 10/1966 | Copper, Jr. | 23—253 X |
| 2,290,116 | 12/1966 | Carroll | 23—230 A |

JOSEPH SCOVRONEK, Primary Examiner

U.S. Cl. X.R.

23—230 A, 232 E, 253 A, 255 E; 208—Dig. 1; 235—151.12